United States Patent [19]

Sasanuma et al.

[11] Patent Number: 5,383,055
[45] Date of Patent: Jan. 17, 1995

[54] IMAGE FORMING APPARATUS INCLUDING MEANS FOR SETTING IMAGE FORMING CONDITION IN ACCORDANCE WITH A JUDGEMENT RESULT

[75] Inventors: Nobuatsu Sasanuma, Yokohama; Hisashi Fukushima, Kawasaki; Tetsuya Atsumi, Tokyo, all of Japan

[73] Assignee: Canon Kabushiki Kaisha, Tokyo, Japan

[21] Appl. No.: 73,391

[22] Filed: Jun. 8, 1993

[30] Foreign Application Priority Data

Jun. 12, 1992 [JP] Japan ................................. 4-153523

[51] Int. Cl.⁶ ............................................. H04N 1/46
[52] U.S. Cl. .................................... 358/521; 358/520
[58] Field of Search ............................... 358/515–521, 358/29–31; 348/223–226, 234–237

[56] References Cited

U.S. PATENT DOCUMENTS

| | | | |
|---|---|---|---|
| Re. 32,544 | 11/1987 | Korman | 358/29 |
| 3,758,707 | 9/1973 | Keller et al. | 358/520 |
| 4,414,635 | 11/1983 | Gast et al. | 358/515 |
| 4,464,677 | 8/1984 | Kuhn et al. | 358/537 |
| 5,051,928 | 9/1991 | Gruters | 364/521 |
| 5,130,789 | 7/1992 | Dobbs et al. | 358/520 |

*Primary Examiner*—Stephen Brinich
*Attorney, Agent, or Firm*—Fitzpatrick, Cella, Harper & Scinto

[57] ABSTRACT

This invention intends to reduce, in the formation of a color image in consideration of the reproducible color region in the image formation, the time required from the start of image formation to the formation of a reproduced full-color image. This is achieved by judging, by a selection circuit 14, whether the color space of the full-color original is within the color reproduction region of the printer, and setting an image processing condition by the selection circuit 14, according to the result of the judgment, after the image formation of a first color but prior to the image formation of a second color.

10 Claims, 3 Drawing Sheets

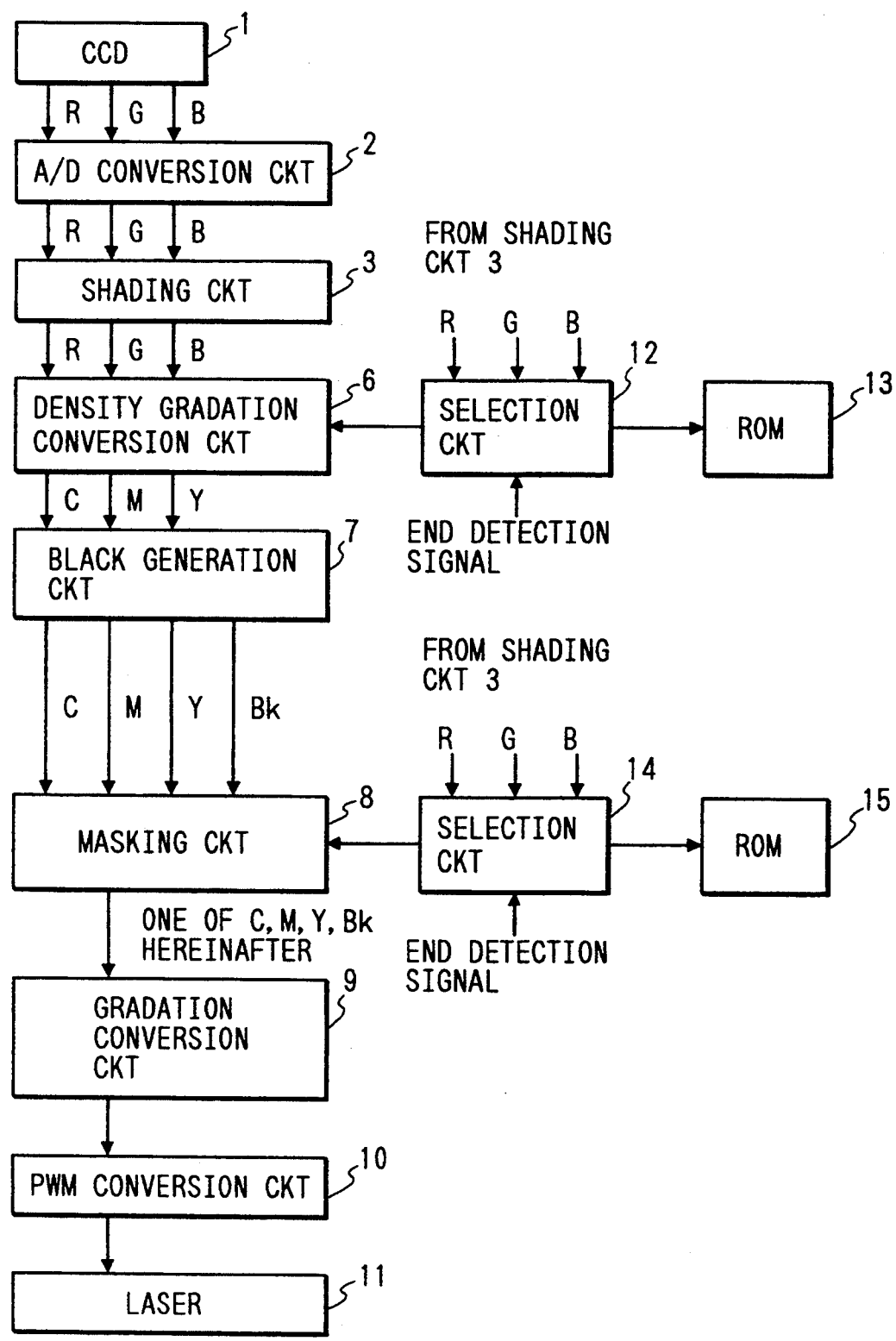

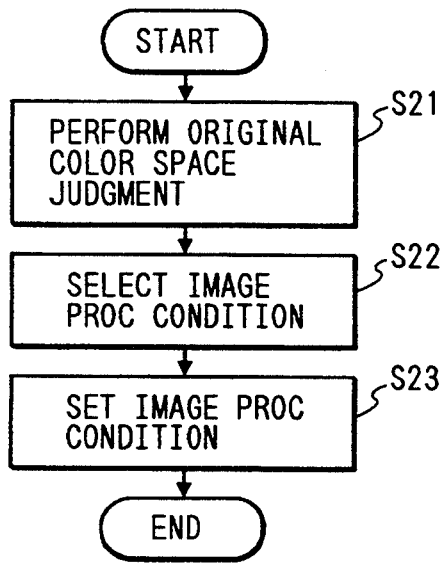
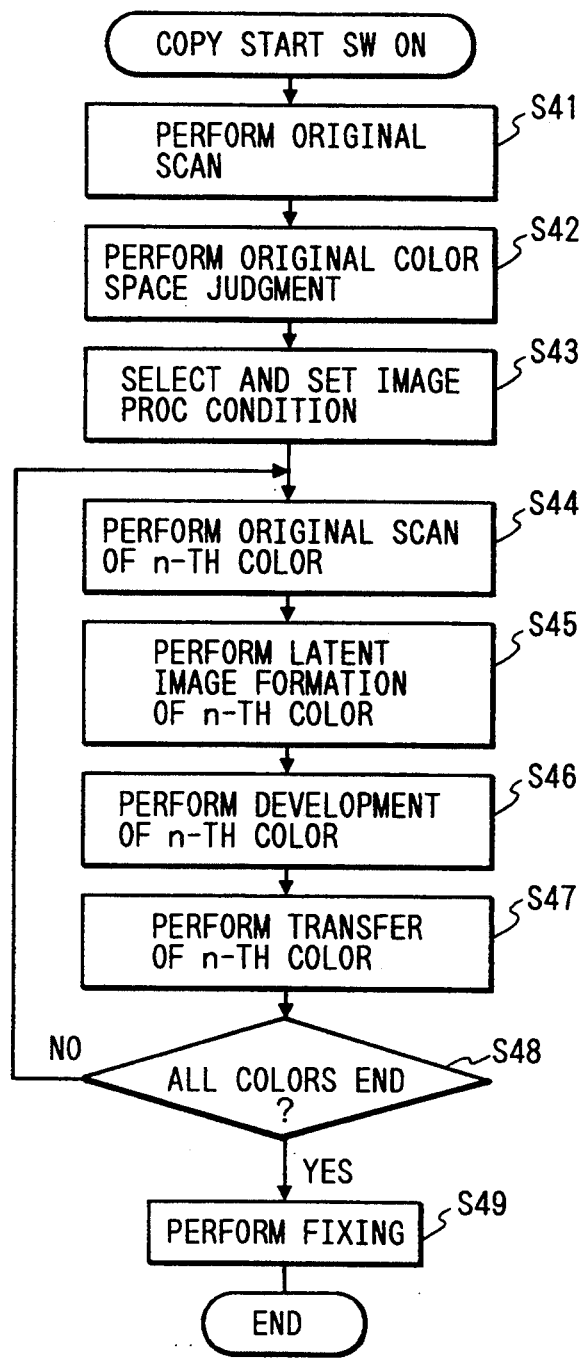

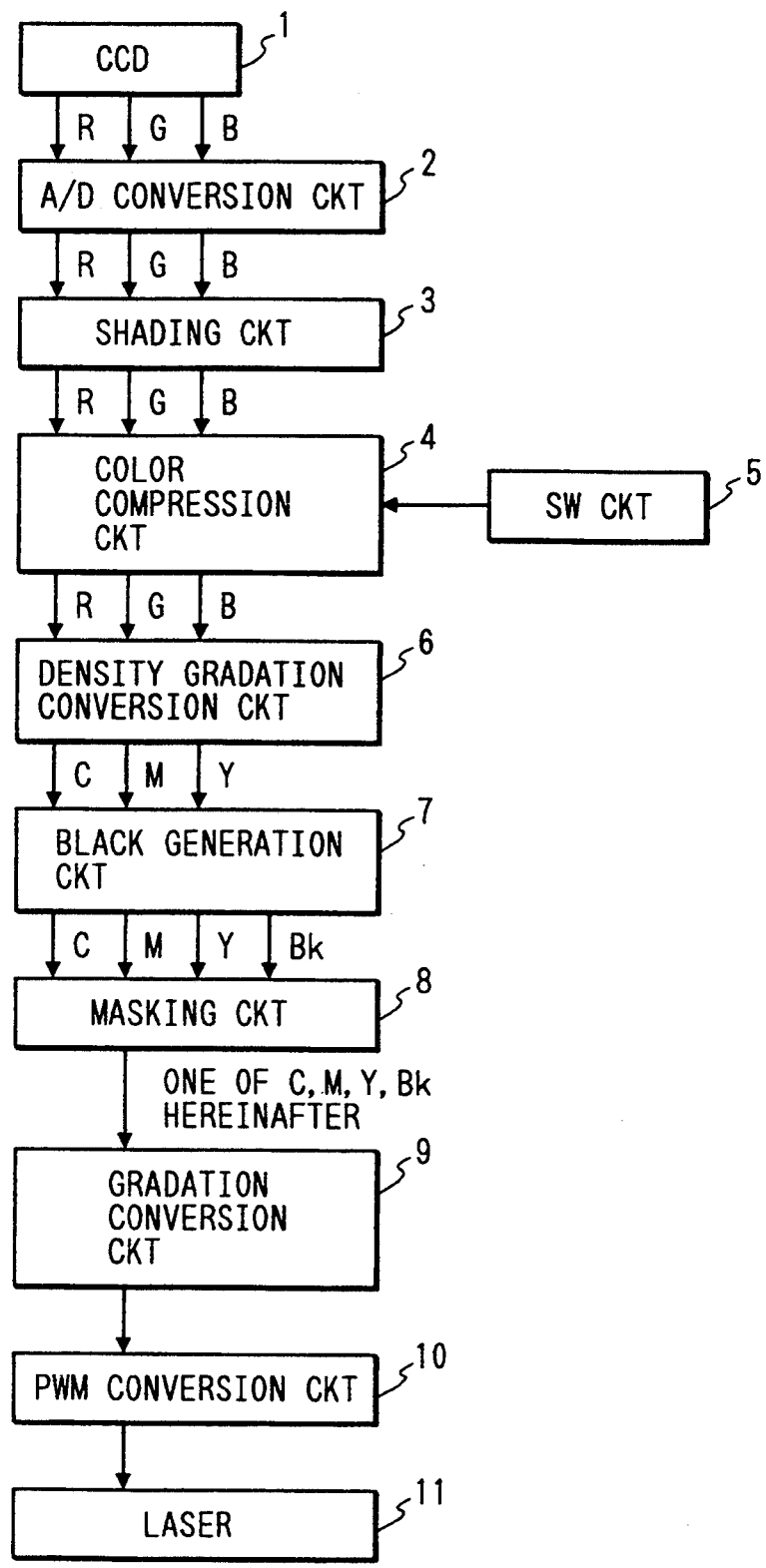

IMAGE FORMING APPARATUS INCLUDING MEANS FOR SETTING IMAGE FORMING CONDITION IN ACCORDANCE WITH A JUDGEMENT RESULT

BACKGROUND OF THE INVENTION

1. Field of the Invention

The present invention relates to a color image forming apparatus, and more particularly to a color image forming apparatus capable of forming a color image in consideration of the reproducible color range.

2. Related Background Art

For improving the color reproducibility, the conventional color image forming apparatus is so designed to effect faithful color reproduction if the color space of the original image is within the color reproduction range of said apparatus, but, if the color space of the original image exceeds the color reproduction range of said apparatus, to convert any color outside said range into a substantially similarly appearing color within said color reproduction range, thereby attaining optimum color reproduction for all the color originals.

In case the color reproduction can be conducted faithfully within the color reproduction range of the color image forming apparatus, the reproduced color image may be recopied as an original, and there is attained an improvement in the color reproducibility in an image obtained by reproducing the thus recopied image.

FIG. 4 is a flow chart showing the sequence of forming a color image by an electrophotographic process.

When a copy start switch is turned on in the color image forming apparatus, a step S41 scans a color original placed on an original table, and the color original image is converted into R, G and B signals by a CCD having color filters on the optical path thereof. Then a step S42 effects color space discrimination based on said R, G and B signals, namely whether the color original is included in the color reproduction range of the color image forming apparatus or contains a color outside said color reproduction range.

The individual parameters have to be varied according to the characteristics of color separation filters, the spectral characteristics of the CCD, the color forming materials and the recording material, and the dot forming method. If the following relations (1) and (2) stand in all the R, G and B signals obtained by scanning, the color space of the color original is included within the color reproduction range of the color image forming apparatus:

$$\max(R, G, B) > Th \quad (1)$$

wherein Th is a threshold value determined from the maximum density of the color image forming apparatus;

$$\left. \begin{array}{l} X = R - G > 0 \\ Y = R - B > 0 \text{ and} \\ Y \geq 0.6X - 50 \\ Y \leq -5.5X + 1000 \\ Y \leq -0.8X + 300 \\ Y \leq -0.2X + 250 \end{array} \right\} \quad (2)$$

The image processing conditions, for example the coefficients to be used in the density-tendition transformation and the matrix parameters to be used in the masking are prepared in advance and are selected according to the result of said discrimination.

Then a step S44 effects the original scanning for a first color and the image processing with the preset image processing conditions. Then a step S45 forms a latent image of the first color, then a step S46 develops said latent image with a coloring material of the corresponding color, and a step S47 transfers thus developed image onto a recording material.

Then there is discriminated whether the latent image formation, image development and image transfer have been completed for all the colors, and, if not, there are executed the original image scanning, latent image formation and image development for a second color in the same manner as for the first color. Subsequently the obtained image is multiple transferred in registration with the image of the first color, and is fixed. Thereafter the steps S44 to S48 are repeated for all the colors, and, when the latent image formation, image development and image transfer are completed for all the colors, the sequence proceeds to a step S49 to effect image fixation. Thus there is obtained a full-color image with optimum color reproduction.

In such conventional process, however, the first copy time from the start of image formation to the printout of the reproduced full-color image requires about 30 seconds and cannot be reduced, because there is conducted an original scanning for discriminating the color of the original.

SUMMARY OF THE INVENTION

The object of the present invention is to resolve the above-mentioned drawbacks and to provide a color image forming apparatus capable, in considering the reproducible color range at the image formation, of reducing the time required from the start of image formation to the printout of the reproduced full-color image.

The above-mentioned object can be attained, according to the present invention, by an image forming apparatus comprising, input means for entering a plurality of color component signals relating to a frame of an image plural times, image forming means for generating a reproduction signal for a plurality of color components frame-sequentially and forming a plurality of color component image in accordance with the reproduction image, judging means for judging whether the image represented by the plurality of color component signals entered by the input means consists of colors within a predetermined color region in a color space, and setting means for setting an image forming condition for the image forming means in accordance with the result of judgment of the judging means, after the formation of an image of an n-th color ($n \geq 1$) and prior to the formation of an image of an (n+1)-th color.

Other objects of the present invention, and the features thereof, will become fully apparent from the following description, to be taken in conjunction with the attached drawings, and from the appended claims.

BRIEF DESCRIPTION OF THE DRAWINGS

FIG. 1 is a block diagram of a first embodiment of the present invention;

FIG. 2 is a flow chart showing an example of the control sequence by a selection circuit 14;

FIG. 3 is a block diagram of a second embodiment of the present invention; and

FIG. 4 is a flow chart showing an example of the sequence of selecting and setting image processing conditions in a conventional color printer.

DESCRIPTION OF THE PREFERRED EMBODIMENTS

Now the present invention will be clarified in detail by preferred embodiments thereof shown in the attached drawings. FIG. 1 is a block diagram of a first embodiment of the present invention.

[First Embodiment]

Referring to FIG. 1, there are shown a CCD sensor 1 for converting an optical signal into an image signal; an A/D converter 2 for converting a luminance signal from the CCD sensor 1 into a digital luminance signal; a shading correction circuit 3 for effecting shading correction on said digital luminance signal, according to the sensitivity fluctuation of the elements of the CCD sensor 1; and a density-gradation conversion circuit 6 for converting the luminance signals R, G, B from the shading correction circuit 3 into density signals Y, M, C.

A ROM 13 stores first coefficients for an original within the color reproduction region and second coefficients for an original containing a color outside the color reproduction region. A selection circuit 12 discriminates, at the original scanning, whether the color space region of the colors of the original image is within the color reproduction region of the printer or includes a region outside said color reproduction region, and selects the first or second coefficients from the ROM 13, according to the result of said discrimination.

A black generation circuit 7 generates a black signal, based on the density signals Y, M, C from the density-gradation conversion circuit 6. A masking circuit 8 effects color correction in order to match the color reproducing characteristics specific to the printer.

A ROM 15 stores first coefficients for use within the color reproduction region, and second coefficients for an original containing a color outside the color reproduction region. A selection circuit 14 discriminates whether the color space region of the colors of the original image is within the color reproduction region of the printer or includes a region outside said color reproduction region, and selects the first or second coefficients from the ROM 15, according to the result of said discrimination.

A gradation conversion circuit 9 is provided for regulating the non-linear characteristics in the density reproduction of the printer. A PWM conversion circuit 10 converts the density signals from the gradation conversion circuit 9 into a signal of a pulse width corresponding to the density represented by said density signal, thereby driving a laser 11. A laser beam emitted from the laser 11 forms dots of a size corresponding to the density, on a photosensitive member.

In comparison with the conventional process, the present embodiment is different in the setting period for the image processing conditions. In the present embodiment, said setting is conducted after the image formation of the first color and prior to the start of image formation of the second color.

The CCD sensor generates the R, G, B luminance signals four times, for frame-sequential formation of the color component images of Y, M, C and Bk.

Based on said R, G, B frame-sequential input signals, the masking circuit 8 releases the frame-sequential reproduction signals in the order of Bk, Y, M and C.

FIG. 2 is a flow chart showing an example of the control sequence of the selection circuit 14.

When the copy start switch is turned on, there is conducted image scanning for the image formation of a first color or black color, and a latent image is formed with the density-gradation conversion coefficients and the masking coefficients for the original color within the color reproduction region of the printer. Subsequently there are conducted black image development and image transfer, thereby forming a visible black image on the recording material.

Also during the period from the original scanning for the black image formation to the black image transfer, there are executed the discrimination and selection of the image processing conditions mentioned above. More specifically, a step S21 discriminates the color space of the original, and a step S22 selects the image processing conditions. Then a step S23 sets the image processing conditions when there is released a signal indicating the end of image formation of the first color.

After the formation of the black visible image, images of three other colors are formed as in the conventional process, and image fixation is conducted after the formations of images of four colors.

Black is selected as the first color, because the image processing conditions to be selected are related to the color reproduction. More specifically, these image processing conditions affect the color matching and the color balance, and the influence on black image is less than that on other colors. Also on actual images there was not observed the difference from the conventional method.

In contrast to the first copy time of about 30 seconds in the conventional actual apparatus, the apparatus embodying the present invention provided a first copy time of about 25 seconds, corresponding to a reduction of about 5 seconds.

[Second Embodiment]

FIG. 3 is a block diagram of a second embodiment of the present invention, wherein components 1-3 and 6-11 are same as those in FIG. 1. In case the original contains a color outside the color reproduction region of the printer, a color compression circuit 4 projects the color signals from the shading correction circuit 3 into the color reproduction region of the printer according to the following equation (3), thereby sending color signals to the density-gradation conversion circuit 6:

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad (3)$$

A switch circuit 5 enables or disables the function of the color compression circuit 4.

In comparison with the first embodiment, the present embodiment differs in the setting method of the image processing conditions. In the present embodiment, if the color space of the original image is not within the color reproduction region of the printer, the switch circuit 5 is turned on to enable the color compression circuit 4. If the color space of the original image is within the color reproduction region of the printer, said switch circuit 5 is turned off to disable the color compression circuit 4.

In the first and second embodiments, the black image forming conditions utilize the coefficients in case the color space of the original image is within the color reproduction region of the printer. Therefore, if the color space of the original image is not within the color reproduction region of the printer, the gradation of the black image is, in strict sense, not in the ideal setting.

Consequently, if the image forming conditions and the color compression are significantly different depending on whether the color space of the original image is within the color reproduction region of the printer, the reproduction of the black image may be felt unpleasant if the color space of the original image is not within the color reproduction region of the printer.

It is therefore possible also to prepare the coefficients for a black image at an intermediate setting in case the color space of the original image is not within the color reproduction region of the printer, thereby maintaining the black image at a level not causing such unpleasant impression.

As explained in the foregoing, the present invention provides an effect of reducing the first copy time, by discriminating whether the color space of a full-color original is within the color reproduction region, and setting image processing conditions according to the result of said discrimination, after the image formation of an n-th color ($n \geq 1$) but prior to the image formation of an (n+1)-th color.

The present invention is not limited to the foregoing embodiments but is subject to various modifications within the scope and spirit of the appended claims.

What is claimed is:

1. An image forming apparatus comprising:

input means for inputting repeatedly a same plurality of color component signals representing a frame of an image;

image forming means for generating respective reproduction signals for a plurality of color components frame-sequentially and forming a plurality of color component images in accordance with the reproduction signals to form a reproduction image;

judging means for judging whether the image represented by said plural color component signals input by said input means consists of colors within a predetermined color region in a defined color space; and setting means for setting an image forming condition for said image forming means in accordance with a result of judgment of said judging means after image formation of an n-th color ($n \geq 1$) but prior to image formation of an (n+1)-th color.

2. An apparatus according to claim 1, wherein said image forming condition is at least one of a luminance-density converting condition, a masking condition and a color-space compressing condition.

3. An apparatus according to claim 1, wherein said image formation of the n-th color is one of black color.

4. An image processing apparatus comprising:

input means for inputting color image data;

color-space compression means for performing a color-space compression process for the color image data input by said input means;

setting means for manually setting whether or not the color-space compression process is performed for the color image data using said color-space compression means; and image formation means for forming an image based on output image data from said color-space compression means.

5. An apparatus according to claim 4, further comprising masking process means for performing a masking process for the output image data from said color-space compression means.

6. An apparatus according to claim 4, wherein said image formation means initially forms a black image.

7. An apparatus according to claim 4, wherein the color image data includes red (R), green (G) and blue (B) color signals.

8. An apparatus according to claim 4, wherein said color-space compression means performs the color-space compression process for the same color image data plural times.

9. An apparatus according to claim 4, wherein said image formation means forms the image using cyan (C), magenta (M), yellow (Y) and black (K) colors.

10. An apparatus according to claim 4, wherein said input means scans an original to generate the color image data, and said image formation means forms the image on a recording medium.

* * * * *